United States Patent [19]

Ettel et al.

[11] Patent Number: 5,477,125
[45] Date of Patent: Dec. 19, 1995

[54] BATTERY CHARGER

[75] Inventors: Victor A. Ettel, Mississauga, Canada; Jan Hohercak, Haje, Czechoslovakia; Jiri K. Nor; Josef V. Soltys, both of Oakville, Canada; Douglas Charles, Mississauga, Canada

[73] Assignees: Inco Limited, Toronto; Norvik Technologies, Inc., Mississauga, both of Canada

[21] Appl. No.: 943,804

[22] Filed: Sep. 11, 1992

[51] Int. Cl.$^6$ .................................. H02J 7/04; H03K 5/00
[52] U.S. Cl. ................................................ 320/20; 320/39
[58] Field of Search .............................. 320/20, 21, 22, 320/40, 23, 24, 31, 32, 39

[56] References Cited

U.S. PATENT DOCUMENTS

| | | | |
|---|---|---|---|
| 3,517,293 | 6/1970 | Burkett | 320/14 |
| 3,559,025 | 1/1971 | Burkett | 320/14 |
| 3,597,673 | 8/1971 | Burkett | 320/5 |
| 3,609,503 | 9/1971 | Burkett | 320/5 |
| 3,614,582 | 10/1971 | Burkett | 320/5 |
| 3,624,481 | 5/1973 | Macharg | 320/39 |
| 3,761,795 | 9/1973 | Clayton et al. | 320/20 |
| 3,886,428 | 5/1975 | Macharg | 320/39 |
| 3,890,556 | 6/1975 | Melling et al. | 320/21 |
| 3,895,282 | 7/1975 | Foster et al. | 320/20 |
| 3,936,718 | 2/1976 | Melling et al. | 320/20 |
| 3,987,353 | 10/1976 | Macharg | 320/39 |
| 4,061,956 | 12/1977 | Brown et al. | 320/22 |
| 4,388,582 | 6/1983 | Staar et al. | 320/20 |
| 4,392,101 | 7/1983 | Saar et al. | 320/20 |
| 4,503,378 | 3/1985 | Jones et al. | 320/20 |
| 4,639,655 | 1/1987 | Westhaver et al. | 320/14 |
| 4,746,852 | 5/1988 | Martin | 320/20 |
| 5,140,252 | 8/1992 | Kizu et al. | 320/20 |
| 5,204,611 | 4/1993 | Nor et al. | 320/21 |
| 5,206,578 | 4/1993 | Nor | 320/14 |
| 5,396,163 | 3/1995 | Nor et al. | 320/21 |

FOREIGN PATENT DOCUMENTS

| | | |
|---|---|---|
| 0005840 | 12/1979 | European Pat. Off. . |
| 311460 | 12/1989 | European Pat. Off. . |
| 0311460 | 12/1989 | European Pat. Off. . |
| 9222120 | 12/1992 | WIPO . |

*Primary Examiner*—Steven L. Stephan
*Assistant Examiner*—Nicholas Ponoma
*Attorney, Agent, or Firm*—Edward A. Steen; Donald E. Hewson; Bruce S. Londa

[57] ABSTRACT

A battery charge is provided which automatically controls the charging process independent of individual battery construction or temperature. Control of the charging process is achieved by periodically interrupting the charging current, determining resistance-free voltage of the battery in fixed intervals after interruptions of current, and comparing the resistance-free voltage with a reference voltage. Reference voltage is automatically determined for each recharging subject by analyzing the change in resistance-free voltage with respect to time during an initial, constant current period to locate certain characteristic points indicative of the onset of overcharge. The charging current is reduced as necessary, so that the resistance-free voltage does not exceed the reference voltage and significant overcharge is avoided.

7 Claims, 9 Drawing Sheets

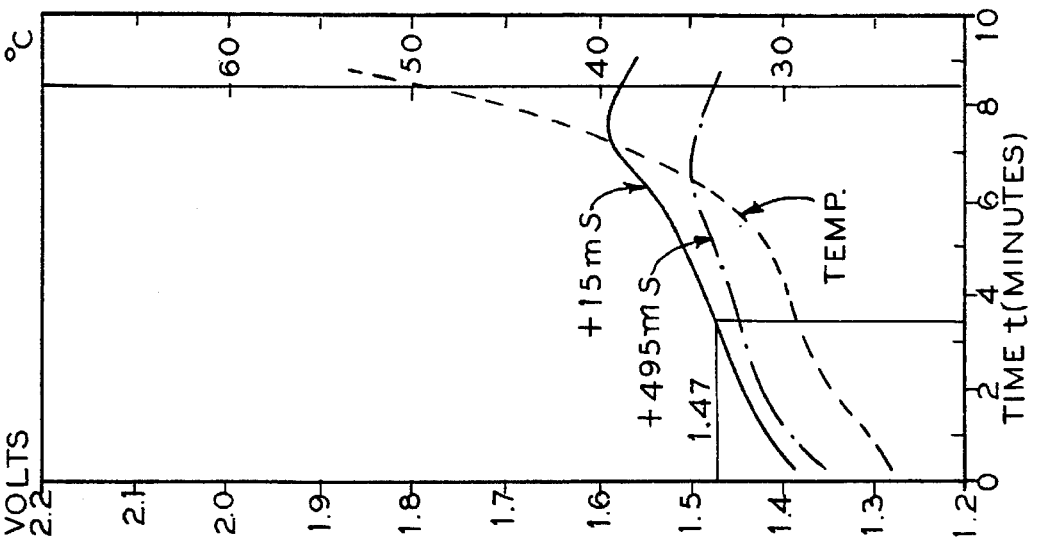
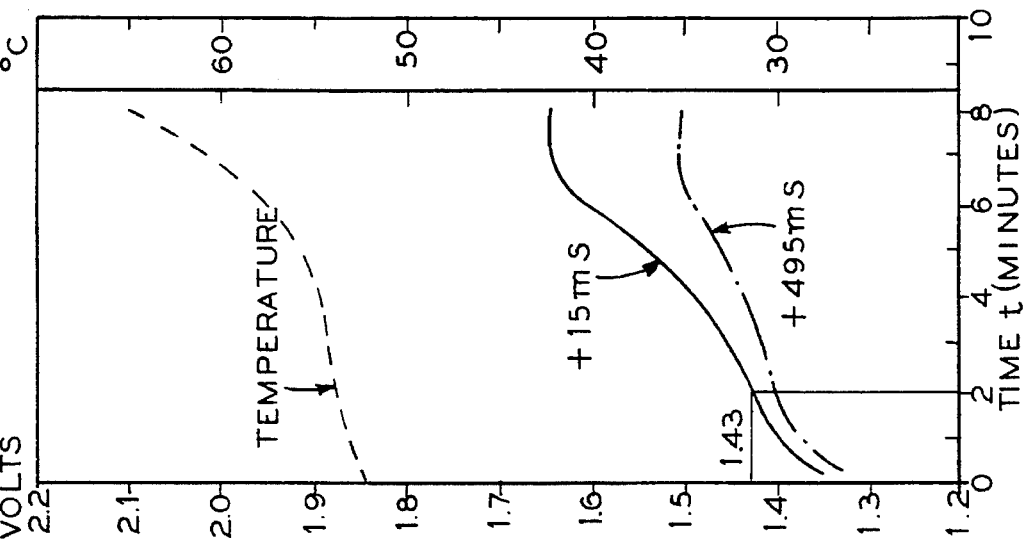
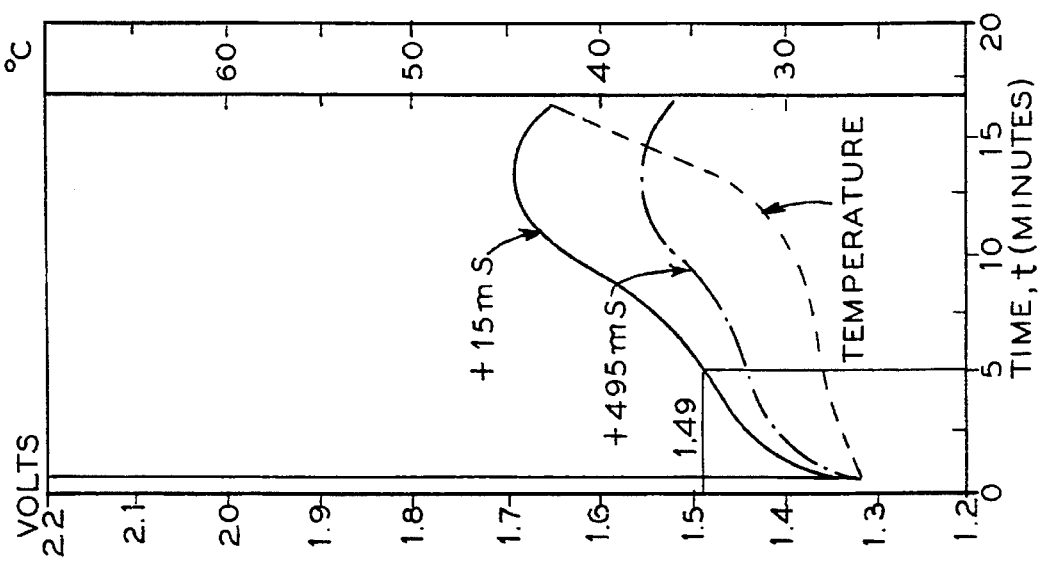

BATTERY CHARGER

BACKGROUND OF THE INVENTION

This invention relates to an improved charging device for rechargeable batteries and cells.

More particularly, this invention relates to an improved battery charger capable of very rapid and "gentle" charging of batteries without causing overcharge and overcharge-related effects such as battery overheating or shortening of cycle life.

Specifically, this invention relates to an improved battery charger which is capable of automatically determining a reference voltage and controlling the charging cycle accordingly to avoid overcharge.

Control of the charging process is achieved by periodically interrupting the charging current, determining resistance free voltage $V_o$ of the battery in fixed intervals after interruptions of current, and comparing the resistance-free voltage with a reference voltage $V_{REF}$ characteristic of the onset of overcharge reactions. The charging current is reduced as necessary, so that the resistance-free voltage does not exceed the reference voltage.

The reference voltage characteristic of the onset of overcharge reactions is determined during a constant current period of charging by determining the resistance free voltage $V_o$ of certain characteristic data points. The characteristic data points may be located on a charging curve, which relates resistance-free voltage $V_o$ to time t. With reference to FIG. 2, the characteristic points are:

1) the first inflection point I(1) of the charging curve $V_o(t)$, where the first derivative $dV_o/dt$ has a minimum,
2) the point K of maximum curvature of the charging curve, also identified as the inflection point on the first derivative curve ($dV_o/dt$), where the second derivative $d^2V_o/dt^2$ curve has a maximum,
3) the second inflection point I(2) on the charging curve, where the first derivative $dV_o/dt$ has a maximum.

A suitable $V_{REF}$ is chosen as a function of either one, or a weighted average of two or more of the above characteristic points. For example, $V_{REF}$ may be computed by increasing values for $V_{I(1)}$ by a certain percentage, or by decreasing values for $V_k$ or $V_{I(2)}$ by certain percentage.

The rechargeable batteries and cells relevant to the present invention are of the type using nickel-cadmium (NiCd), nickel-metal hydride (NiMeH), leadacid and other chemistries. These are used in various applications ranging from small appliances like shavers, cordless power-tools, portable telephones, computers, toys, etc; as well as traction batteries for forklift trucks, golf carts and electric vehicles.

With the expected increase in reliance on electric vehicles, rapid and "intelligent" charging of such vehicles is a particularly important application because of the occasional need to extend its limited range by quick recharging on the road at an electrical "gas pump". Even when recharging the electric vehicle more slowly at a home charging location, it will be very important for the charger to avoid overcharging, which shortens battery life and which is characteristic of most currently used charging methods. An electric vehicle battery will represent a considerable investment and extending its life by using an intelligent charger will be required for economic feasibility. The term "intelligent charger" as used herein refers to the capability of the charging device to automatically determine the capacity of any subject rechargeable battery, and to control the charging cycle so as to reach maximum saturation without significant overcharge.

The charging of batteries involves forcing electrical current through the battery, usually under some control of the current (e.g. constant current) and often with some voltage control as well (e.g. maximum voltage). While there is some need for controlling the rate of the charging process itself, the most important need for control results from the need to stop the charging process when the battery becomes fully charged. After this point, continued charging of the battery leads to undesirable and wasteful overcharge reactions. Overcharge reactions in vented cells result in electrolysis and loss of water that has to be replaced; while in sealed cells it creates pressure and heat, as the recombination reactions of gases produced by overcharge reaction is exothermic.

Ideally, the overcharge reactions may require higher voltage and can be prevented simply by limiting the charging voltage to a certain value. This simple approach is, unfortunately, only partially successful with certain cell types, e.g. lead acid cells, vented NiCd cells, and sealed Li-ion cells.

Sealed cells capable of recombination of the overcharge reaction products (eg. NiCd cells) will usually tolerate overcharge at low rates, where the pressures of by-product gases are low and the heat generation is slow enough for the heat to be easily dissipated and lost. The need to stop the charging process when the battery becomes full is not too critical if no electrolyte constituent is being lost. However, continuous overcharge even at a low rate often reduces the cycle life of the cells.

Rapid charging, i.e. charging in less than one hour, presents much more of a challenge with both vented and sealed cells. The first problem results from the limited rate of charge distribution or equilibration within the electrode plates, so that some pans of the active mass which are electrochemically more accessible become fully charged and driven into the overcharge reaction, while some other pans of the active mass are not yet fully charged. The generalized charge acceptance curve in FIG. 1 shows that this problem is aggravated by increasing currents. That is, at higher charge rates the overcharge reactions will begin to show at a lower fraction of full charge. In the overcharge region the current efficiency of the charge reactions is declining and most of the coulumbic energy is being wasted on the overcharge reactions. To complete the charging process under these conditions one has to tolerate the overcharge reactions at the given rate for a sufficiently long time. In practice, this is often the case. As a result, the fast charge NiCd cells are more strongly catalyzed to prevent excessive pressure build-up during the overcharge period. This approach using a limited overcharge period is popular as it permits using simple charging technology developed for medium charging rates (1–6 hrs). However, the rapid heating of a battery during high rate overcharge cannot be avoided. Other problems include the possibility of exceeding a safe pressure, and cell venting, especially at lower temperatures, when the recombination catalyst is not as effective.

The methods used to terminate the rapid charge/overcharge process at the desired point are best discussed with the help of charging voltage curves illustrated in FIG. 2. Reduced and oxidized forms of active mass, $Ni(OH)_2$ and $NiO(OH)$, will be designated as $M_{red}$ and $M_{ox}$, respectively.

The first section A of the voltage curve $V_o/t$ represents the initial rapid voltage increase of a deeply discharged cell due to the first production of $M_{ox}$, followed by voltage profile flattening during the main charge period, where there are sufficient amounts of both $M_{ox}$ and $M_{red}$ forms of the active mass. The second part B of the curve starts at the first inflection point I(1) and reflects the voltage increase due to the onset and then gradual increase of the first overcharge reaction. Part C starts at the inflection point I(2), where the overcharge reaction begins to dominate. The curve is separated at point K, the point of maximum curvature, so that part C can reflect differences between vented cells $C_v$ and sealed cells $C_s$. For vented cells, the voltage curve at $C_v$ finally flattens to a plateau corresponding to the first overcharge reaction. In sealed cells with recombination, the overcharge reaction results in a noticeable increase in temperature starting at the first inflection point and becoming very visible after the second inflection point I(2). If cell voltage has a negative temperature coefficient (e.g. NiCd batteries), a peak P instead of the plateau will result from the rapid temperature increase in this part of the charging curve at $C_s$.

One popular charge control system for sealed NiCd batteries is based on stopping the charging current after detecting the voltage peak. Some overrun, e.g. 10 mV, is necessary to distinguish between the real peak and the noise of the voltage readings. This "negative delta V" method works well for charging rates of about one hour. Of course, significant overcharge cannot be avoided by this method, as it depends on the effect of overheating caused by overcharging.

More sophisticated methods use detection of the second inflection point I(2) to stop the charging process. This method permits reducing the charging time to 15 minutes. Some overrim of the inflection point is again necessary, and overcharge is not totally avoided.

Both methods depend on crossing the charge/overcharge line in FIG. 1 to finish the charge at high rate, and will cause some unnecessary and deleterious heating of the battery. Because most batteries heat during discharge due to the thermodynamic and irreversible heat effects, additional heating on charging will result in rapid overheating of the battery in heavy use.

A much more logical approach to rapid charging is reducing the charging rate at the point where ;overcharge reactions begin to appear, which requires essentially following the charge/overcharge boundary line in FIG. 1. In this way, overcharge reactions are avoided, pressure increase is very low and the cell does not heat up due to the recombination mechanism of the overcharge reaction. NiCd cells with low internal resistance can even cool due to the endothermicity of the charge reaction.

One practical way of determining the onset of overcharge reactions is based on measuring resistance-free (open circuit) voltage during short but frequent interruptions of the charging current and comparing it to an external preselected reference voltage typical of the onset of overcharge reaction. When the sensed resistance-free voltage reaches this preset value (compensated for temperature), the current is gradually reduced so that the reference voltage is never exceeded. This method is described in U.S. Pat. No. 5,179,335 issued Jan. 12, 1993.

This method of "tapering" the current based on reading the resistancefree voltage of the battery works very well with certain vented and sealed batteries. Low resistance sealed NiCd batteries can be charged in as little as 5 minutes with less than 10° C. temperature rise, or in 15 minutes with a temperature decrease. Conventional lead-acid batteries can be charged in 20 minutes, and aircraft-starting vented NiCd batteries can be charged in 15 minutes.

This method, however, does have significant disadvantages compared to the voltage curve method described above. Namely, the reference voltage used to control the charging process along the charge/overcharge line in FIG. 1 depends on the number of cells in the battery, on temperature, and to some degree on cell construction. While it is not especially difficult to set the proper $V_{REF}$ for the number of cells and their temperature, incorporating the effects of individual cell construction to the value of $V_{REF}$ is more complicated.

SUMMARY OF THE INVENTION

It is the object of this invention to overcome these problems by providing an "intelligent" charger which can operate independently of individual cell characteristics or temperature. Accordingly, our novel battery charger compiles and analyzes a charging curve measured under resistance-free condition by sampling cell voltage at a fixed interval after each current interruption and determining the appropriate value of $V_{REF}$ from the position of one or more points characteristic of the onset of overcharge. $V_{REF}$ determined by this method will automatically reflect the number of cells, temperature and construction, thus permitting the charging device to recharge any subject battery without prior knowledge of its individual parameters. A preferred embodiment incorporates a microprocessor to coordinate and perform many of the required functions.

BRIEF DESCRIPTION OF THE DRAWINGS

FIG. 4 is similar to FIG. 3A except that charge current was 2.5 A and charge rate is 4 C.

Figure 1:
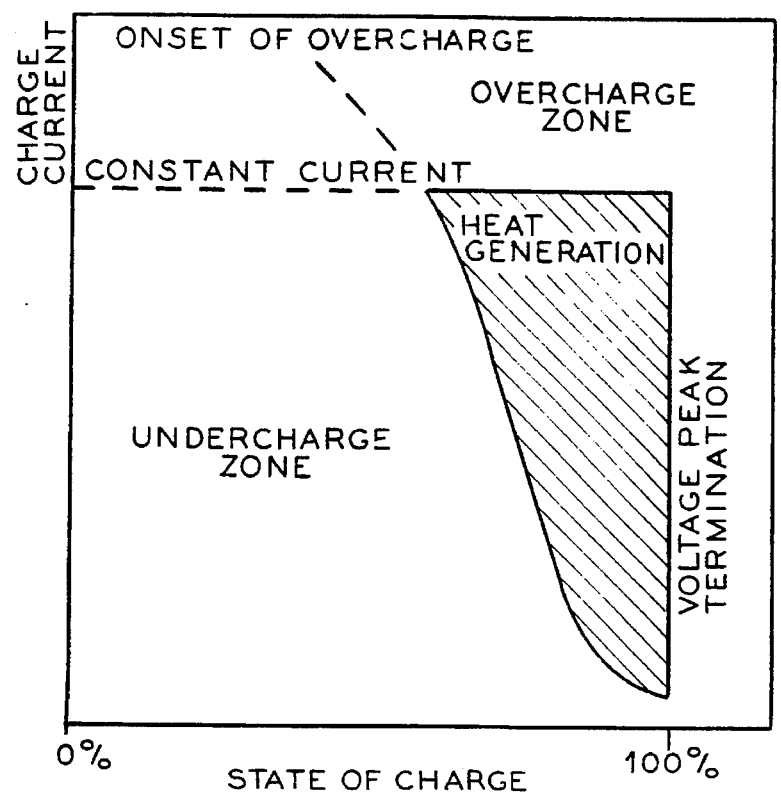
FIG. 1 is a graph showing generalized charge acceptance for rechargeable batteries under rapid charging conditions.
Figure 2:
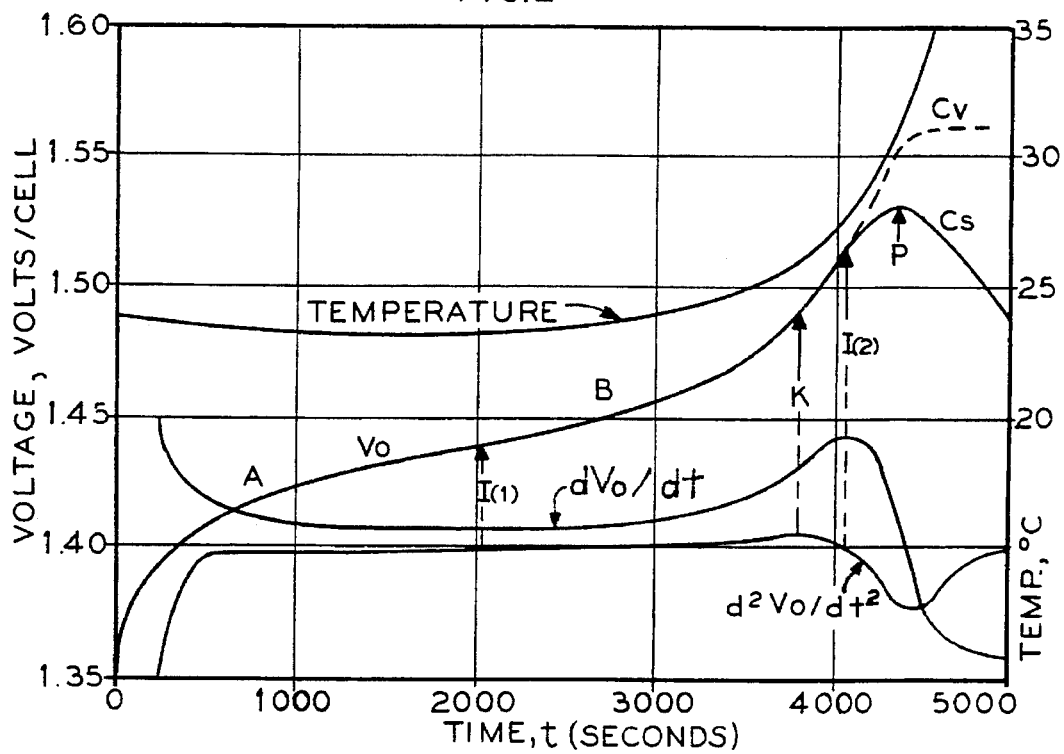
FIG. 2 is a graph showing generalized temperature and charging curves with respect to elapsed charging time t.
Figure 3B:
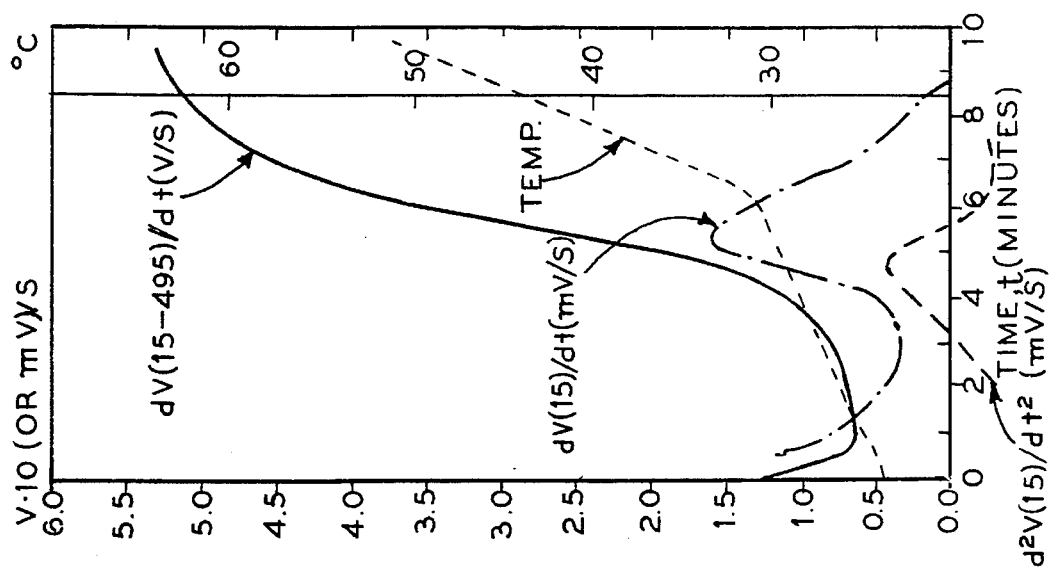
FIG. 3B is a graph showing the first and second derivative curves of the 15 msec $V_o(t)$ curve of FIG. 3A.
Figure 3A:
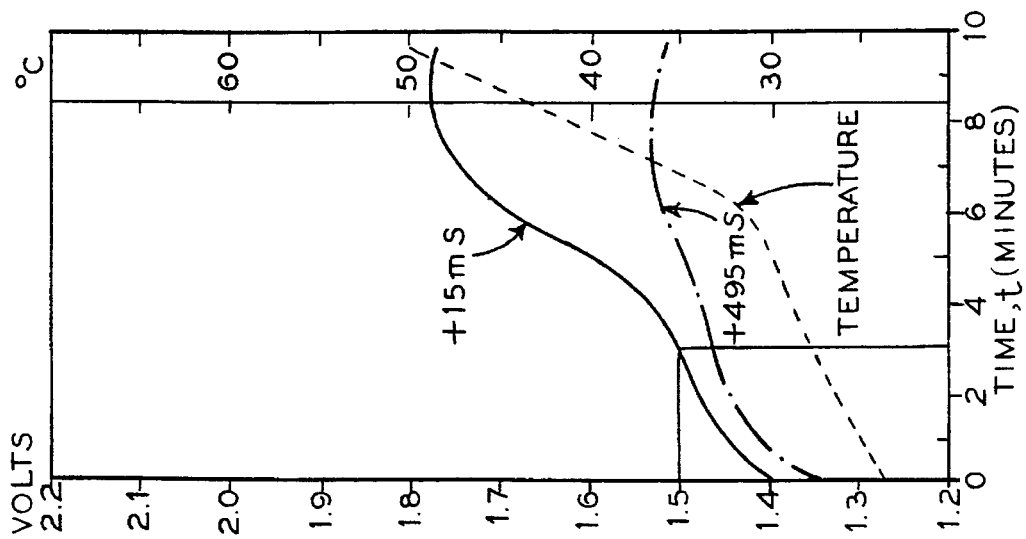
FIG. 3A is a graph showing temperature and resistance-free voltage $V_o$ with respect to time t, measured at 15 msec and 495 msec during the current-off interval, for cell brand X, charged with 5 A current at a rate of 8 C, with the cell initially at ambient room temperature.

FIG. S is similar to FIG. 3A except that the initial cell temperature was about 53° C. and charge current was 10 A.

FIG. 6 is similar to FIG. 3A except that cell brand Y was used.

Figure 7:
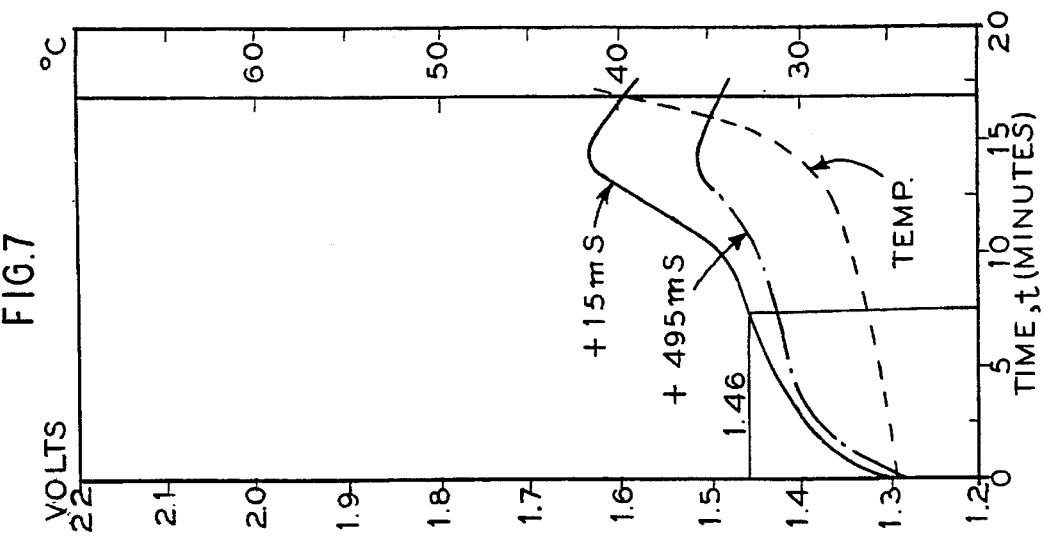

FIG. 7 is similar to FIG. 4 except that cell brand Y was used and the charge rate was 4 C.

Figure 8:
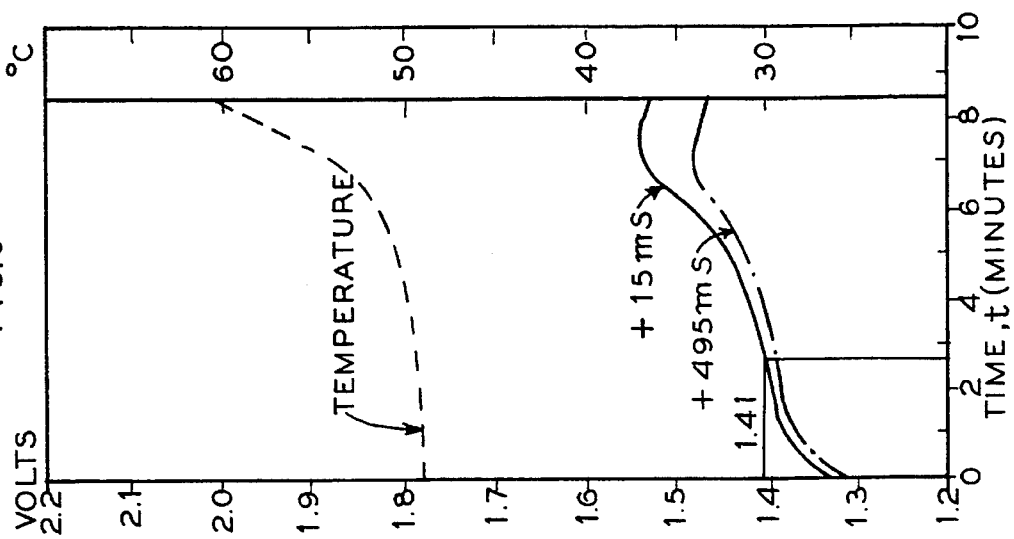

FIG. 8 is similar to FIG. 5 except that cell brand Y was used and the initial cell temperature was about 49° C.

Figure 9A:
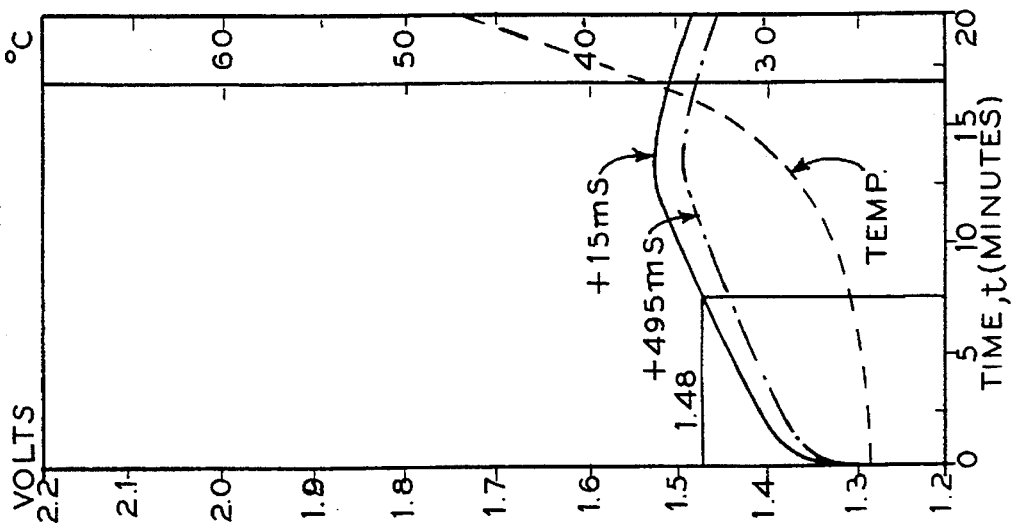

FIG. 9A is similar to FIG. 3A except that cell brand W was used.

Figure 9B:
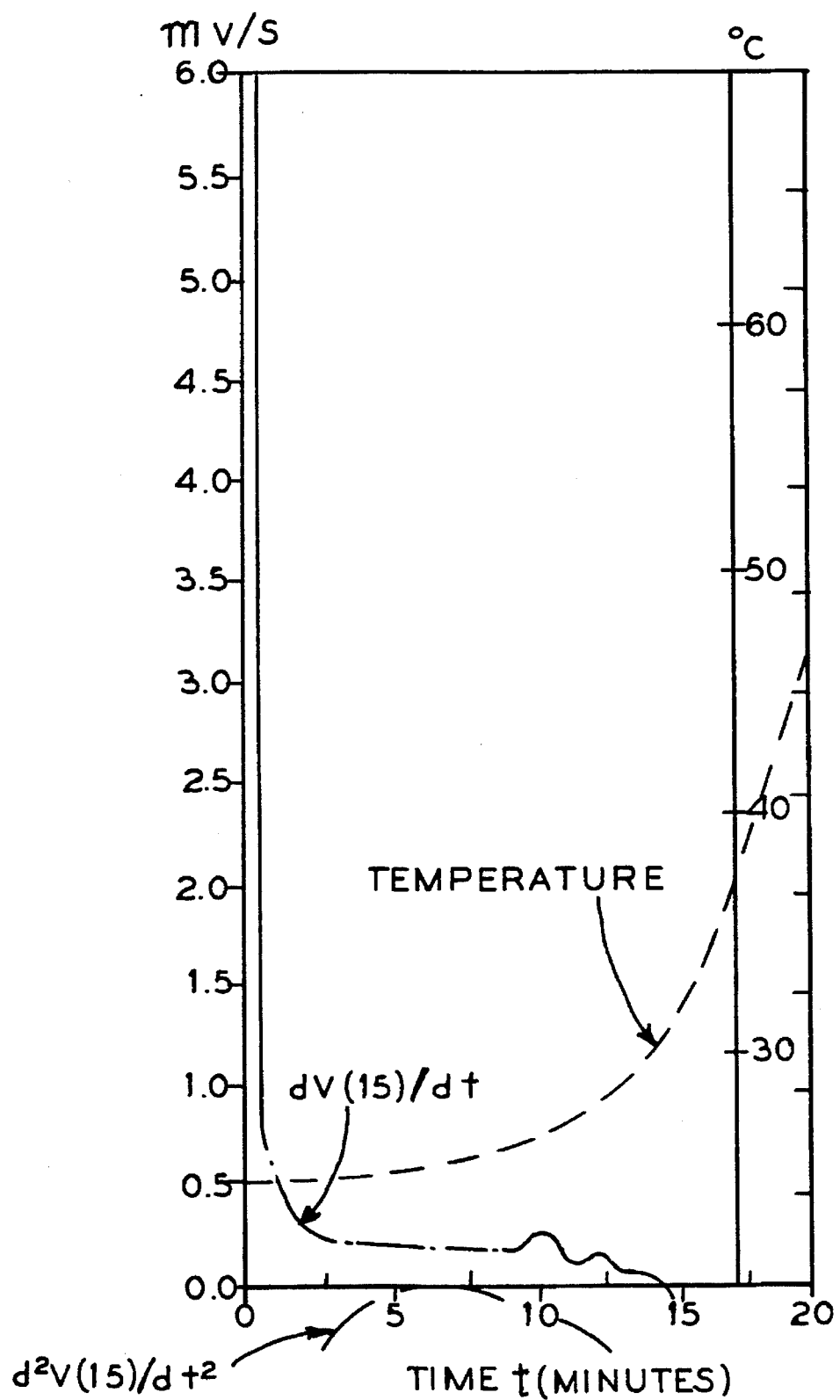

FIG. 9B is a graph showing the first and second derivative curves of the $V_o(t)$ curve of FIG. 9A.

Figure 10:
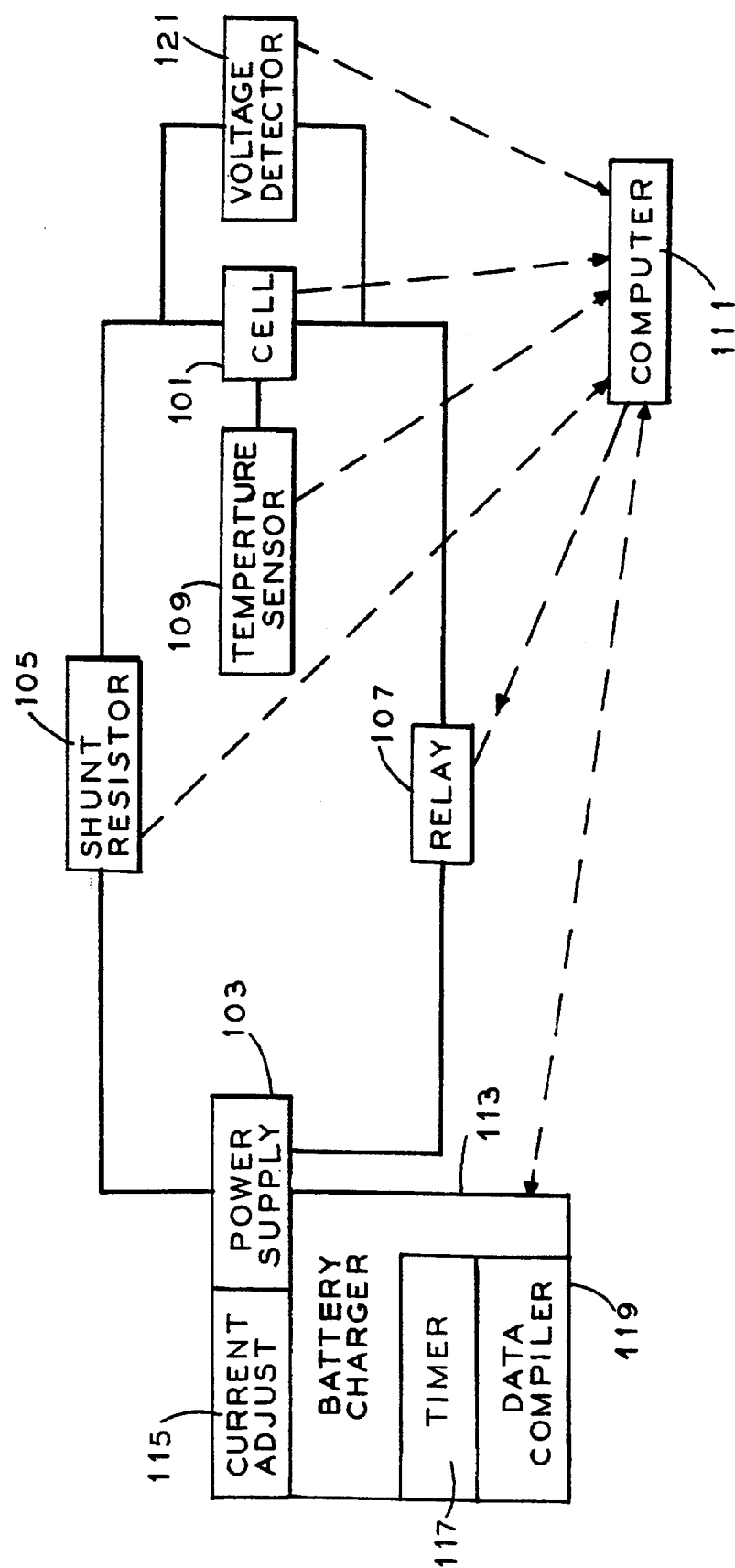

FIG. 10 is a schematic circuit diagram for one embodiment of the invention.

Figure 11:
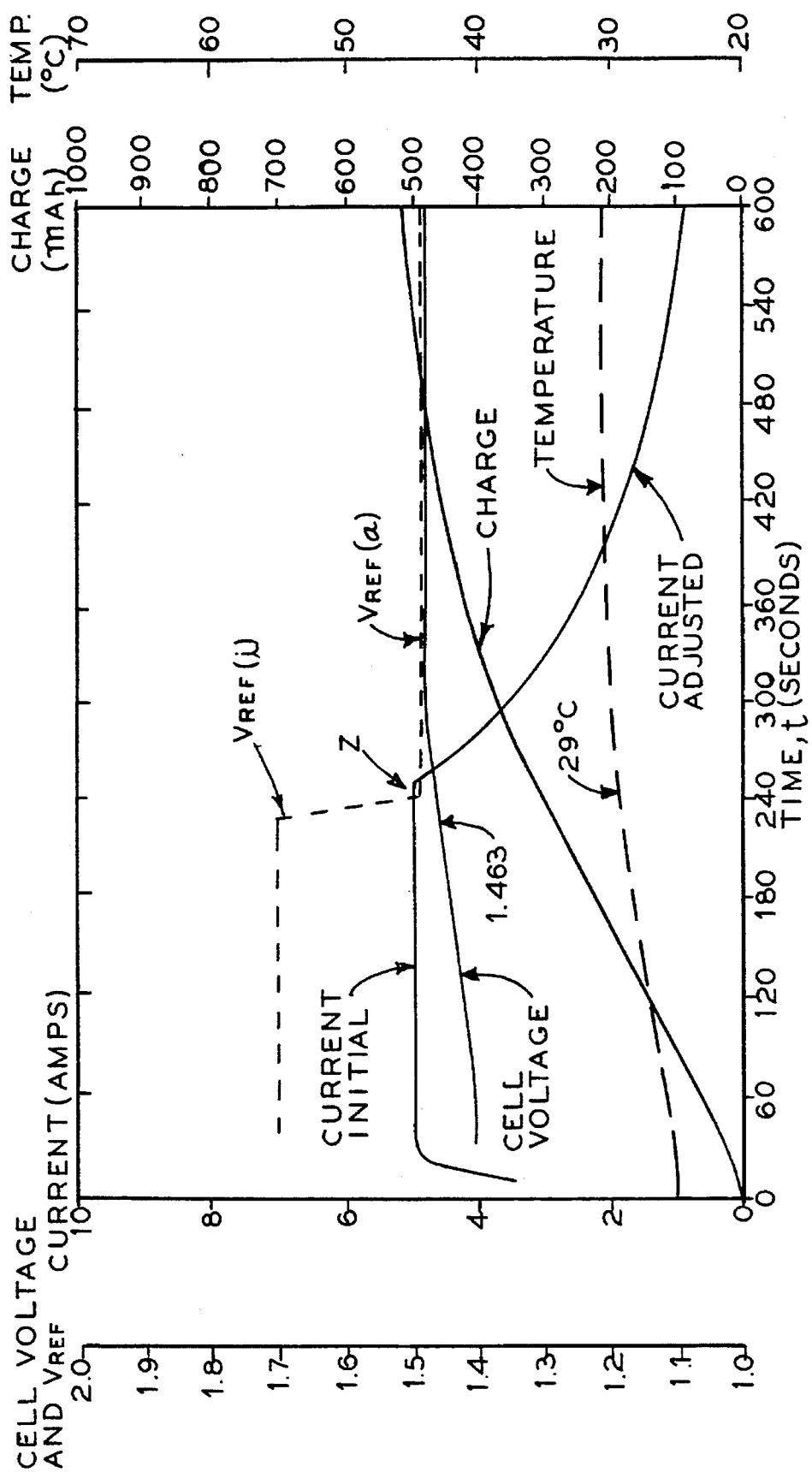

FIG. 11 is a graph showing results obtained with the charger of the invention with one particular cell type at an ambient temperature.

Figure 12:
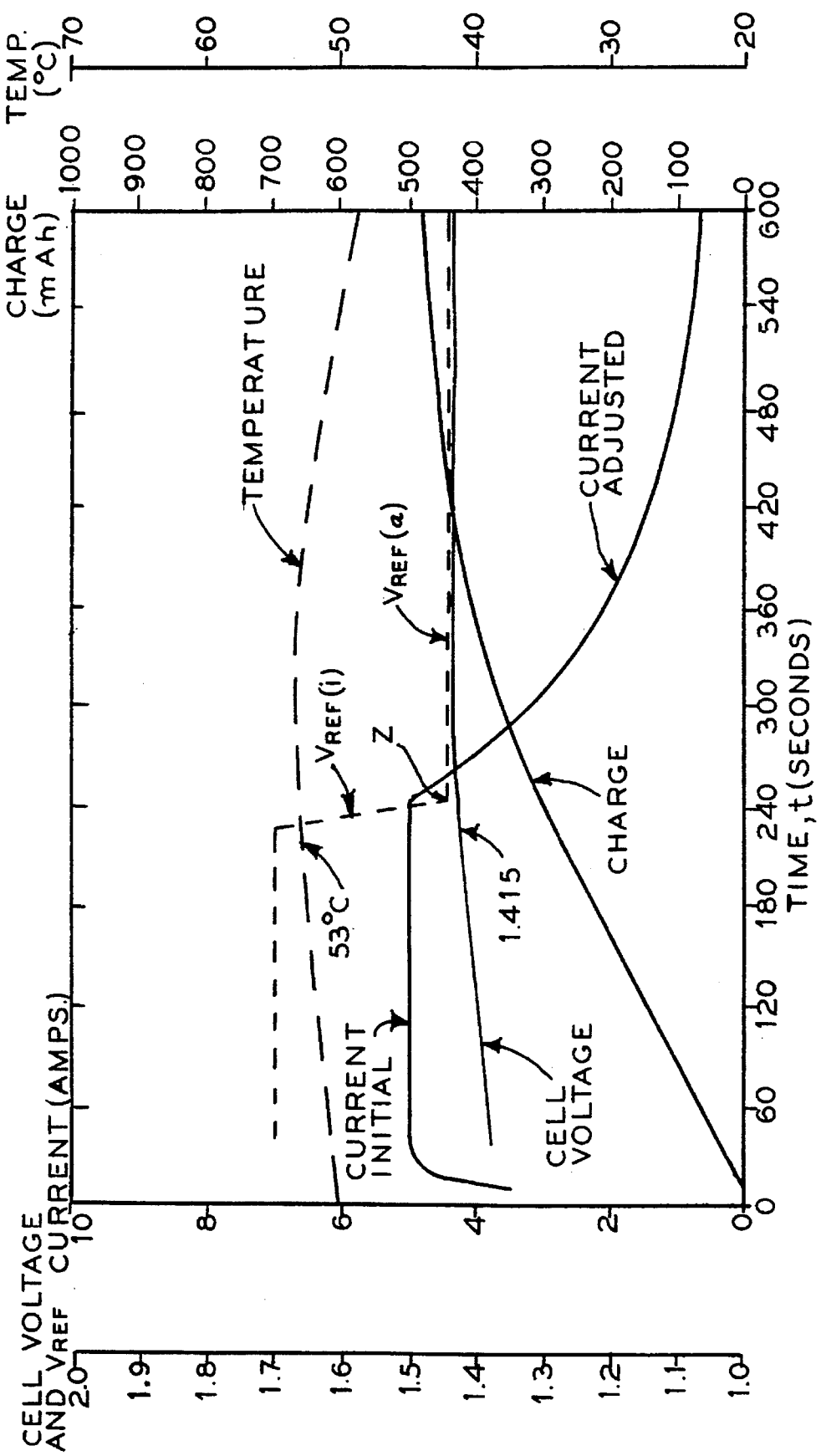

FIG. 12 is similar to FIG. 11 except that the cell temperature was elevated.

Figure 13:
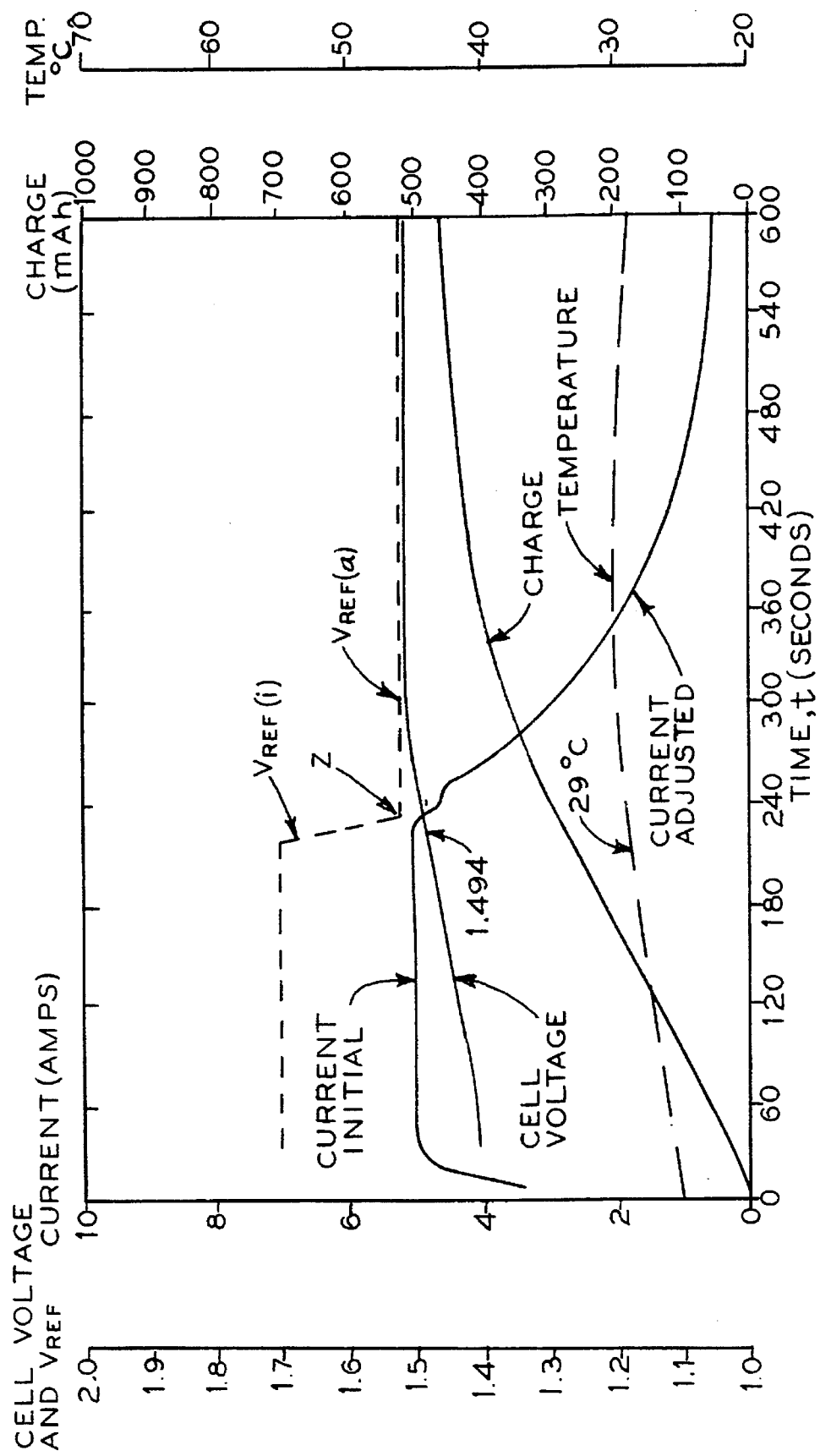

FIG. 13 is a graph showing the results obtained with the charger of the invention with a second cell type at an ambient temperature.

DETAILED DESCRIPTION OF THE INVENTION

All data was obtained utilizing commercially available cells, identified here for simplicity as cells X, Y and W. FIGS. 3A and 4 show charging data obtained with two sealed NiCd cells of AA size and 600 mAh label capacity produced by battery-maker X, charged with 5 A current (8 C rate), and with 2.5 A current (4 C rate). FIG. 5 shows the same cell X charged at a higher temperature of about 53° C. with 10 A (8 C rate). FIGS. 6–8 show parallel charging data obtained with cells of another manufacturer designated Y. Cells X and Y were selected to represent extreme examples in the range of industrial cells.

Figure 3C:
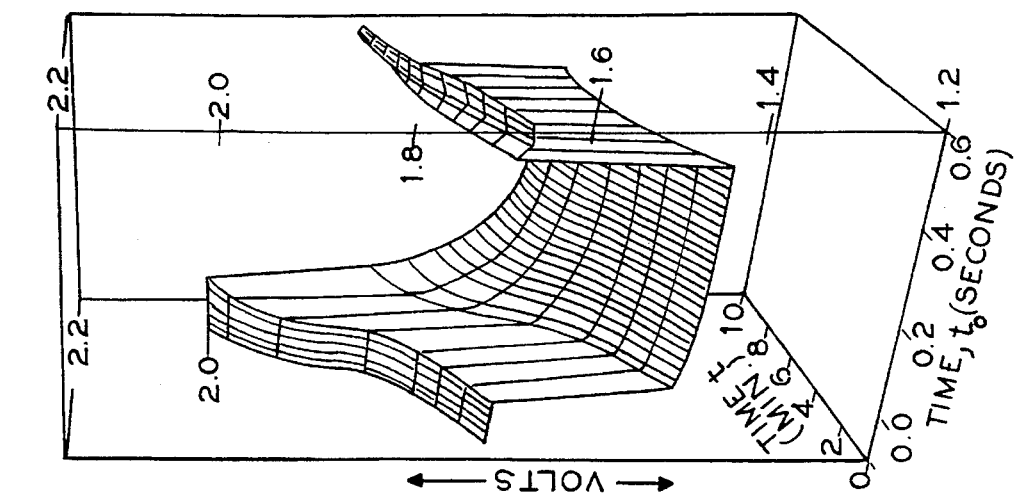
FIG. 3C is a three dimensional graph showing $V_o(t)$ curves for values of $V_o$ measured at various times $t_o$ during the current-off intervals, under the conditions for FIG. 3A.

FIG. 3C, using the conditions used for FIG. 3A, shows a complete individual voltage decay curve (values of $V_o$) taken over 500 msec long current-off periods which are repeated every 10 sec. During the current-off periods voltage decay curves are sampled at to every 10 msec, as well as during the preceding and following 100 msec. In FIGS. 3A, 4–8, and 9A, voltage samples taken at 15 and 495 msec after interrupting the current are plotted as two separate resistance free voltage profile curves, together with the temperature profile. The temperature profile curve (measured by a thermocouple touching the outside surface of the cell) shows the increase in slope due to overcharge. Due to the external mounting of the thermocouple, the temperature curve is delayed relative to the onset of overcharge reactions.

Comparing now the 15 msec $V_o$ voltage curves of Cell X in FIGS. 3A and 4, it can be seen that the first inflection point occurred at essentially the same voltage of 1.49–1.50 V, showing that $V_{I(1)}$ is independent of charging rate. The same conclusion can be reached by examining data for cell Y in FIGS. 6 and 7, except that $V_{I(1)}$ is lower at 1.46–1.47 V. It can be seen that the whole voltage profile curve is higher for cell X and that the separation becomes even more dramatic after the first inflection point. This difference between the $V_{I(1)}$ values for cells X and Y of about 30 mV is consistent with our experience with these cells using the charging method of the referenced U.S. Pat. No. 5,179,335.

The data for FIGS. 5 and 8 were taken with cells X and Y preheated to about 50° C. before charging with 10 A current. The same relative picture emerges as cell X again has a first inflection point on the 15 msec curve at higher voltage than cell Y. However, both hot cells now have inflection point voltages $V_{I(1)}$ 50–100 mV lower, as expected from the temperature coefficient of the NiCd cells. This again corresponds to the experience with these same cell types using known technology described above.

From these data it is clear that the resistance-free voltage value at the first inflection point can be used to set the reference voltage $V_{REF}$ for the controlled current part of the charging curve and that it is no longer necessary to know battery voltage, temperature and construction in advance to determine the best value for $V_{REF}$. One method for easily determining the position of the first inflection point I(1) is as a minimum on the first derivative of voltage with respect of time. To eliminate uncertainty caused by small fluctuations of the voltage samples, it is usually necessary to use an electrical or mathematical filter (rolling averages) and to allow certain overrun of the inflection point (a fixed overrun of the minimum on the first derivative curve.)

It is also possible to set the value of $V_{REF}$ in certain relation to the measured value at the inflection point so that the desired driving force of the charging process can be varied as needed. One possibility is to set the $V_{REF}$ higher by a fixed percentage than the voltage read at the first inflection point.

Another possibility is to continue charging until the next characteristic point on the charging curve is detected, which is the point of maximum curvature K. This point may be determined by locating the inflection point on the first derivative curve where the second derivative curve $d^2V/dt^2$ has a maximum. The $V_{REF}$ may then be set equal to the resistance free voltage $V_K$ or in certain relation thereto, for example as 98% of the $V_k$ value.

It is also possible to continue charging beyond the point of maximum curvature K until the second inflection point I(2) has been detected, at which point some overcharge is already taking place. $V_{REF}$ may then be set as a certain percentage less than $V_{I(2)}$ (e.g. at 95% of $V_{I(2)}$). This point may be located as the maximum on the first derivative curve $dV_o/dt$.

It is also possible to set the value of $V_{REF}$ as a function of any of these characteristic resistance free voltages $V_{I(1)}$, $V_K$ and $V_{I(2)}$, for example as a certain weighted average of these values.

The examples above used the voltage profile curve composed of voltages sampled at 15 msec after each current interruption. It is possible to use voltage samples taken at other fixed times during the current off period. FIG. 3C shows a voltage profile curve generated continuously for varying times during the current off period. Furthermore, even voltage samples taken without or before current interruptions may be used, although the presence of resistance caused voltage will make the control of the charging process much less accurate.

The function of identifying and confirming the location of the characteristic points on the resistance-free voltage charging curve, reading the characteristic voltages of these points, setting the $V_{REF}$ value based on the measured values of resistance free voltage at these points, and controlling the current to assure that the resistance free voltage $V_o$ remains at or below the value of $V_{REF}$, is most easily achieved using a microprocessor. Using a microprocessor also permits adding various safety back-up functions, current control and shut-off criteria. These are important in cases where the inflection point is obscured by the presence of badly mismatched cells in a battery pack, or where there are too many cells in a battery pack (e.g. electric vehicle battery). These problems are addressed by using smaller groups of cells within the battery pack and controlling the charging current based on the "weakest link", i.e. the group of cells first realizing the onset of overcharge.

Accidental overcharge often occurs in cases where the first inflection point is obscured. Such uses, as seen in FIG. 9A with respect to cell brand W, may be predicted based on the observation that these cells have a poorly developed "saddle", in other words, they do not have a clear minimum or maximum on the first derivative curve $dV_o/dt$ as seen in FIG. 9B. Overcharging may be prevented, however, by observing that such cells do have an inflection point on that curve at the point of maximum curvature K, which can be detected as a maximum on a second derivative curve $d^2V_o/dt^2$ as seen in FIG. 9B. The position of this point corresponds again to the first onset of overcharge. Generally, cells with high internal resistance, i.e. those which heat too much during rapid charge, have a less developed "saddle shape". Also, NiMeH cells tend to have a less developed "saddle shape" than NiCd cells, lead-acid cells and others. It is therefore convenient to use $V_K$ as a secondary "failsafe" criterion for setting $V_{REF}$ if the inflection points on the charge curve were obscured because of the shape of the curve.

Naturally, there are many additional back-up criteria which could be useful in preventing accidental overcharge. These can be based on temperature increase, $V_o$ increase, reaching or exceeding the second inflection point by a certain percentage, or by comparing the measured values between different sections of the battery.

While the above description has focused on sealed NiCd cells, the same method can be used with other rechargeable cells displaying the "saddle shape" charging curve.

FIG. 10 shows a schematic circuit diagram for a preferred embodiment of the claimed invention. A rechargeable cell or battery 101 is connected to a power supply 103 along with a shunt resistor 105 utilized for measuring current, a relay 107 to interrupt the current, and a temperature sensor 109. A computerized data acquisition and relay control system, e.g., a microprocessor or computer 111, is used to run and monitor the operation of the circuit.

Two tests were run with the aid of a microprocessor according to the circuit diagram of FIG. 10. In place of a simple power supply, the inventors routed power through an existing battery charger 113, in this case a 5 amp Minit-Charger™ battery charger available from Norvik Technologies, Inc. of Mississauga, Ontario, Canada. The battery charger 113 included a current adjustment means 115, a timer 117, and a data compiler 119. Resistance-free cell voltage $V_o$ was measured using a voltage detector 121 10 msec after each opening of the relay. The relay was set to open the circuit every 10 sec for a 500 msec period. The $V_o$ values were monitored during the charge by the microprocessor, which in turn used these data to control the charging process. Graphs displaying the results of a test using Y brand AA type rechargeable cell are shown for ambient temperature (FIG. 11) and elevated temperature (FIG. 12). FIG. 13 shows the results of the same test as FIG. 11 using X brand AA type rechargeable cells.

At the outset of the charging operation, a dummy initial reference voltage $V_{REF(i)}$ was set purposely high to allow the initial charging operation to operate at full capacity. During initial charging, the microprocessor monitors the values for $V_o$ as described above and processes the data to determine the minimum point I(1) on the first derivative curve of $V_o$ with respect to time t elapsed since charging commenced, as discussed in general with reference to FIG. 3A. To safely identify the minimum on the $dV_o/dt$ curve, an overrun of 0.04 mV/s was allowed before triggering a change of $V_{REF}$. $V_{REF}$ was calculated as 102% of $V_o$ at the point of triggering (point Z). The microprocessor then set the value for adjusted reference voltage $V_{REF(a)}$ as the value for $V_o$ at point I(1), and communicated the value for $V_{REF(a)}$ to a current control system incorporated into the Minit-Charger™ battery charger.

As can be seen for both battery brands, in FIGS. 11–13, the value for $V_{REF(a)}$ was set at point Z on the graphs. The charging circuit of the invention automatically set the $V_{REF(a)}$ according to the nature of each cell, in this case slightly higher for the brand X batteries by about 30 mV in tests of similar temperature (FIGS. 11 and 13), which is consistent with known values for these brands. Similarly, the charging circuit of the invention set the $V_{REF(a)}$ about 50 mV lower for the hot brand Y cell (FIG. 12), which again is consistent with the known temperature dependence of $V_{REF}$ with NiCd cells. Once $V_{REF(a)}$ has been set at point Z, the charging circuit continues to monitor $V_o$ as above, and controlling the charging current so that $V_o$ never exceeds $V_{REF(a)}$. At point Z, the adjusted current shows a quick drop and then a tapering off in response to instructions from the microprocessor. As a result, the cells are rapidly, but gently, charged to saturation without significant overcharge, as shown by the charge curve in FIGS. 11–13. Also apparent is the establishment of good temperature control, which is normally a serious problem when charging cells of these types using existing technology.

As different types of cells and batteries have different values for temperature coefficient of $V_{REF}$, the ability of the claimed charging circuit to correctly charge cells of different temperatures without having to be set according to this parameter is a major advance in the art. For example, the claimed device will charge a metal hydride or NiCd cell equally well, without having to know the identity or the nature of the different cells.

What is claimed is:

1. A method of charging rechargeable cells or batteries, comprising the steps of:

charging the cell or battery with a constant initial charging current, periodically interrupting the charging current to provide a current-off interval of fixed duration, sampling the resistance-free voltage $V_o$ at a fixed time during each current-off interval, compiling the values for $V_o$ with respect to the time t elapsed since commencement of charging, analyzing the compiled values for $V_o$ and t to locate one or more points characteristic of the onset of overcharge, choosing a overcharge reference voltage $V_{REF}$ as a function of one or more of the characteristic points, adjusting the charging current periodically such that $V_o$ does not exceed $V_{REF}$, whereby significant overcharge is avoided.

2. The method of claim 1, wherein the values compiled for $V_o$ and t are used to create a charging curve $V_o(t)$ and a first derivative curve $dV_o/dt$ and the characteristic points are located as points on the curves corresponding to values for $V_o$.

3. The method of claim 2, wherein the values compiled for $V_o$ and t are used to create a second derivative curve $d^2V_o/dt^2$.

4. The method of claim 3, wherein the characteristic points are chosen from the group consisting of the following points on the charging curve $V_o(t)$:

a. a first inflection point I(1).

b. the point of maximum curvature K, c. a second inflection point I(2), and d. a function of any two or all three of the above points.

5. The method of claim 4, wherein the first inflection point I(1) is located as the minimum on the first derivative curve $dV_o/dt$.

6. The method of claim 4, wherein the point of maximum curvature K is located as the maximum on the second derivative curve $d^2V_o/dt^2$.

7. The method of claim 4, wherein the second inflection point I(2) is located as the maximum on the first derivative curve $dV_o/dt$.

* * * * *